United States Patent [19]

Schapira

[11] 4,308,523
[45] Dec. 29, 1981

[54] APPARATUS AND METHOD FOR CHARACTER RECOGNITION

[75] Inventor: Alexander D. Schapira, Montclair, N.J.

[73] Assignee: Compuscan, Incorporated, Teterboro, N.J.

[21] Appl. No.: 118,412

[22] Filed: Feb. 4, 1980

[51] Int. Cl.³ ............................................. G06K 9/68
[52] U.S. Cl. ............................................ 340/146.3 Q
[58] Field of Search ............... 340/146.3 Q, 146.3 E, 340/146.3 Y, 146.3 S; 250/567, 568

[56] References Cited

U.S. PATENT DOCUMENTS

| | | | |
|---|---|---|---|
| 3,069,079 | 12/1962 | Steinbuch et al. | 340/146.3 Y |
| 3,152,318 | 10/1964 | Swift | 340/146.3 Q |
| 3,167,745 | 1/1965 | Bryan et al. | 340/146.3 Q |
| 3,292,149 | 12/1966 | Bourne | 340/146.3 E |
| 3,576,534 | 4/1971 | Steinberger | 340/146.3 Q |
| 3,727,183 | 4/1973 | Lemay | 340/146.3 Q |
| 3,878,509 | 4/1975 | Kikuchi et al. | 340/146.3 Q |
| 4,136,332 | 1/1979 | Kadota et al. | 340/146.3 Q |
| 4,153,897 | 5/1979 | Yasuda et al. | 340/146.3 Q |
| 4,200,861 | 4/1980 | Hubach et al. | 340/146.3 Q |

Primary Examiner—Leo H. Boudreau
Attorney, Agent, or Firm—Stephen B. Judlowe

[57] ABSTRACT

A practice for storage recognition of unknown document characters contained in a matrix representation of a document region wherein a plurality of arrays of matrix positions incrementally displaced in accordance with a predetermined displacement pattern are interrogated and the results of these interrogations processed in accordance with predetermined reference character recognition equations to derive catalogues of errors. The lowest errors in the derived catalogues are analyzed to determine the reference characters recognizable as unknown document characters.

22 Claims, 14 Drawing Figures

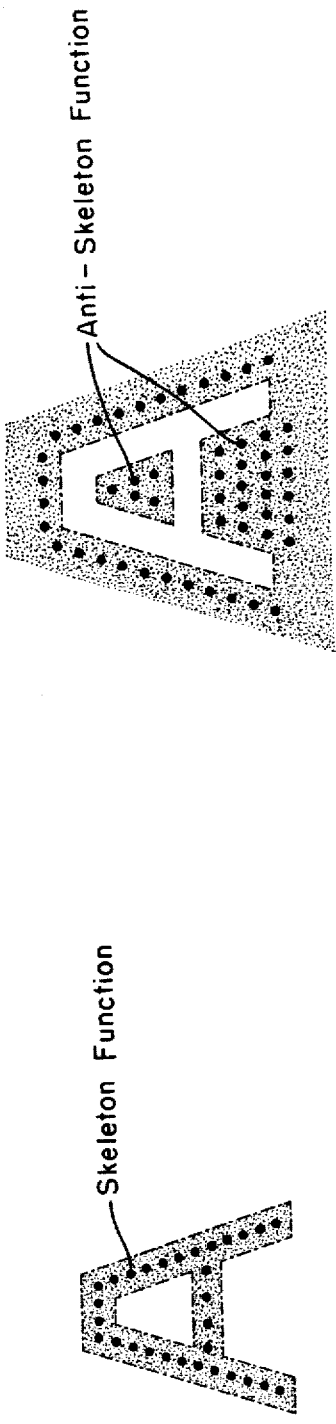
FIG. 5A
FIG. 5B
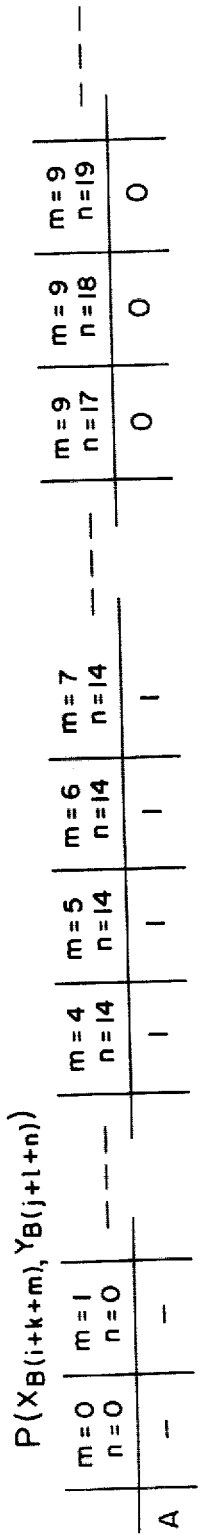
FIG. 6
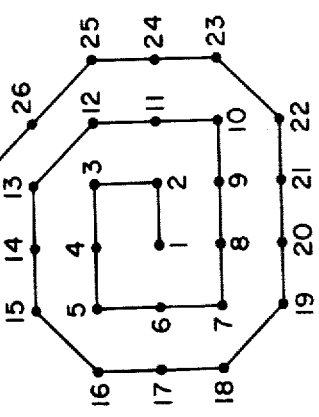
FIG. 7A
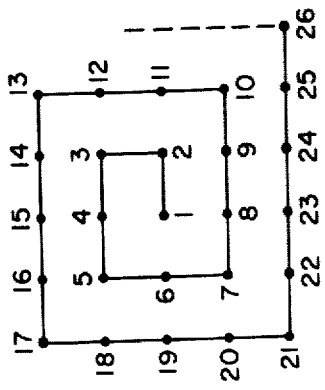
FIG. 7B

| Pattern Position | k | l |
|---|---|---|
| 1 | 0 | 0 |
| 2 | 1 | 0 |
| 3 | 1 | -1 |
| 4 | 0 | -1 |
| 5 | -1 | -1 |
| 6 | -1 | 0 |
| 7 | -1 | 1 |
| 8 | 0 | 1 |
| 9 | 1 | 1 |
| 10 | 2 | 1 |
| 11 | 2 | 0 |
| 12 | 2 | -1 |
| 13 | 2 | -2 |
| 14 | 1 | -2 |
| 15 | 0 | -2 |
| 16 | -1 | -2 |
| 17 | -2 | -2 |
*FIG. 8A*
| Pattern Position | k | l |
|---|---|---|
| 1 | 0 | 0 |
| 2 | 1 | 0 |
| 3 | 1 | -1 |
| 4 | 0 | -1 |
| 5 | -1 | -1 |
| 6 | -1 | 0 |
| 7 | -1 | 1 |
| 8 | 0 | 1 |
| 9 | 1 | 1 |
| 10 | 2 | 1 |
| 11 | 2 | 0 |
| 12 | 2 | -1 |
| 13 | 1 | -2 |
| 14 | 0 | -2 |
| 15 | -1 | -2 |
| 16 | -2 | -1 |
| 17 | -2 | 0 |
*FIG. 8B*
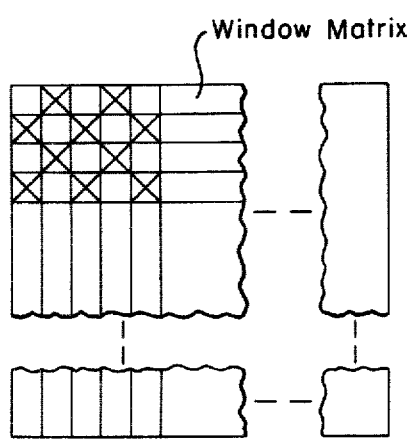
*FIG. 9*
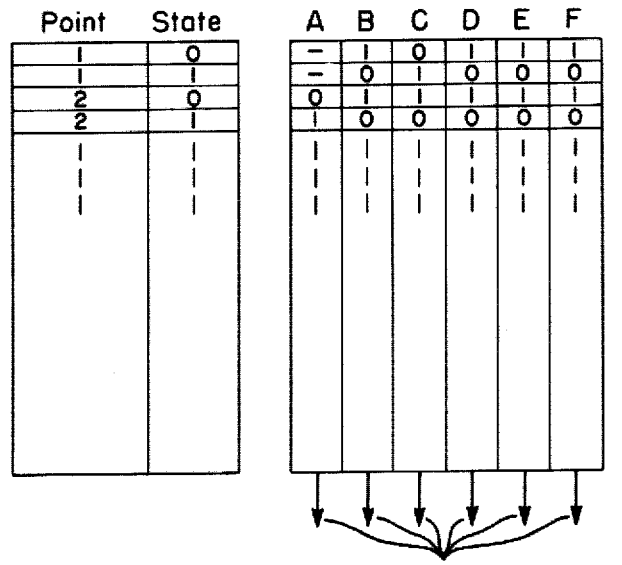
To Respective Error Counters
*FIG. 11*

APPARATUS AND METHOD FOR CHARACTER RECOGNITION

BACKGROUND OF THE INVENTION

This invention pertains to symbol or character recognition systems for use in entering data into computer data processing systems.

In present day technology, the information contained in documents is often required to be stored in a form suitable for processing by high speed electronic data processing systems. One method of storing the document information requires that the information which, typically, might be in the form of characters or symbols of a particular font, be read from the document, recognized and, thereafter, stored in a machine readable code for further automatic processing. Reading and recognizing of the document information must necessarily be carried out with a high degree of accuracy, regardless of document character quality and/or the occurrence of multiple document characters (i.e., underlined characters, accented or otherwise overstruck characters).

To this end a wide variety of systems have been proposed to perform these functions. In many of these systems, each document region containing an unknown character, after suitable alignment, is scanned or read by a scanning system to form an analog signal corresponding to the scanned document region. This analog signal is transformed into a digital signal, each of whose bits corresponds to an incremental time span of the analog signal and, therefore, to an associated incremental document area. Each bit of the digital signal is assigned a first state if its associated incremental document area contains a character segment (usually black) and a second state if its associated document area contains background (usually white). The digital signal is read into a shift register or other storage element to form a digital matrix respresentation of the document region. Recognition of the unknown chararacter is carried out by comparing the digital matrix representation with other representations indicative of reference characters corresponding to the characters usable on the document. Recognition occurs when a comparison with a particular reference character results in a minimum discrepancy or difference.

U.S. Pat. No. 3,233,219 discloses one system of this type wherein each reference character is defined in terms of a matrix representation each of whose positions is assigned probabilities corresponding to the probabilities of its associated incremental area containing a character segment or background. The unknown character is transformed into a digital matrix representation, as above-described, such that the character is situated in horizontal registration in the matrix. The matrix positions are interrogated and the states of the positions determined and used in conjunction with the reference character matrices to recognize which reference character is most probably represented by the unknown character. Recognition is carried out by using the determined state of a matrix position to simultaneously trigger probabilty values for that state associated with corresponding matrix positions of the reference characters. The probability values associated with the matrix positions of the reference characters are represented by a resistance matrix having resistance values inverse to the logarithms of their corresponding probabilities. When a determined state of a particular matrix position triggers its corresponding probabilities, respective currents related to these probabilities are developed by the corresponding resistances for the reference characters. Each current is summed with previous currents determined for other matrix positions for that reference character. After all matrix positions have been interrogated, resultant sum currents are obtained for the respective reference characters. The reference character having the smallest sum current is indicative of the character most likely represented by the unknown character.

The U.S. Pat. No. 3,233,219 further contemplates a procedure to compensate for vertical misregistration of the unknown character in its matrix representation by incrementally moving the character through the matrix vertically one vertical position and repeating the above procedure of position interrogation and sum current formation. The unknown character is thus moved vertically through the matrix, and a sum current obtained for each reference character for each vertical position. The sum currents for each reference character are stored and the lowest sum current for a particular reference character determined as representative of that reference character. The reference character whose representative sum current is lowest is then determined as having the highest probability of being the unknown character.

Finally, the U.S. Pat. No. 3,233,219 contemplates a reduction in the number of reference character matrix positions whose probabilities need be considered in the recognition procedure. The patent suggests limiting the matrix postions to only those which, from a large sampling of a particular reference character, are found to be always of the same state. Thus, the probabilities of character matrix positions found to substantially always contain a character segment or background are considered in this form of the recognition system. This reduces the number of resistances in the resistance matrix. A further reduction in the resistance matrix is also suggested through elimination of resistances indicative of high probability states of the matrix positions. In this form, the only resistances utilized to contribute to the sum current for each reference character are those indicative of the low probability state of a matrix position.

It is an object of the present invention to provide an improved character recognition system and method.

It is a further object of the present invention to provide a character recognition system of improved accuracy which is insensitive to character quality and multiple characters.

SUMMARY OF THE INVENTION

In accordance with the principles of the present invention, the above and other objectives are realized in a practice wherein unknown characters within a matrix representation of a document region are recognized by interrogating a plurality of arrays of matrix positions. These arrays are incrementally displaced in accordance with a predetermined displacement pattern and are definable in terms of a window or interrogation matrix which is incremented in accordance with such pattern. During interrogation of any particular array (i.e., for any particular window matrix position defined by the displacement pattern), the matrix positions of the array are interrogated in sequence and the results of each interrogation are processed using predetermined character recognition equations to determine whether the interrogation is indicative of an error in any one of a number of reference characters. An error occurs when the state of an interrogated matrix position is opposite the state assigned to a respective character for that matrix position. Error determinations for each reference character are added or summed to form a composite error for that reference character. Interrogation of successive arrays provides successive catalogues of errors corresponding to the reference characters.

By appropriate selection of the displacement pattern defining the arrays and the character recognition equations, the lowest errors in the respective catalogues when grouped together will evidence a reference character which appears frequently and which has a small average error. Other reference characters will appear infrequently with relatively higher average errors. The frequently occurring reference character with small average error will thus be recognized as the unknown character and be located in matrix positions defined by the arrays resulting therein.

In preferred form, the invention further contemplates determining from certain of the arrays for which low errors were obtained for a recognized character, the expected location in the matrix representation of the next unknown character in the document region. This expected position is then utilized to establish the plurality of arrays for the next interrogation and recognition procedure. Also in this preferred form, the displacement pattern defining the arrays is selected to follow a spiral-like path.

In further preferred form, the character recognition equations utilized with the invention define each reference character in terms of the states of relevant character positions. The relevant character positions are selected as those positions whose states remain unchanged in the face of expected limits of character distortion and/or displacement and can be derived from the skeleton and anti-skeleton of the particular character.

BRIEF DESCRIPTION OF THE DRAWINGS

The above and other features and aspects of the present invention will become more apparent upon reading the following detailed description in conjunction with the accompanying drawings in which:

FIGS. 5A and 5B illustrate the skeleton and anti-skeleton functions of the character A of FIG. 2;

FIG. 6 illustrates a recognition matrix equation derived from the functions in FIGS. 5A and 5B;

FIGS. 7A and 7B show spiral-like displacement patterns usable with the character recognition unit of FIG. 1;

FIGS. 8A and 8B show parameters of a window matrix corresponding to the displacement patterns in FIGS. 7A and 7B, respectively;

FIG. 9 illustrates a modified form of a window matrix;

FIG. 11 shows schematically one of the character recognition equation storage elements of FIG. 10.

DETAILED DESCRIPTION

Figure 1:
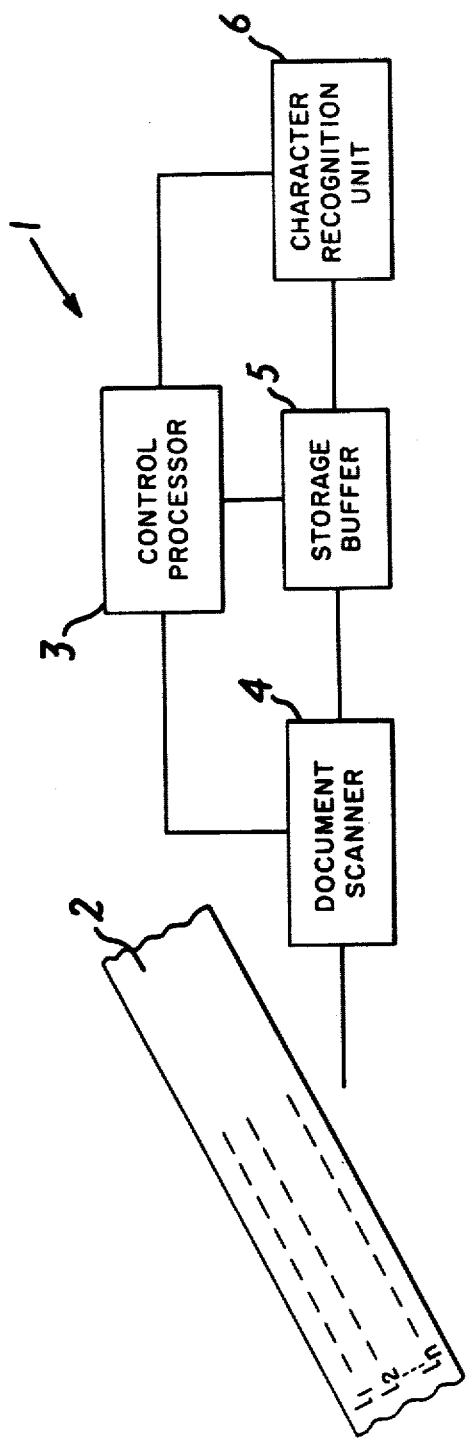
FIG. 1 illustrates in block diagram form a system for recogntion storage of the character contents of a document.
Figure 2:
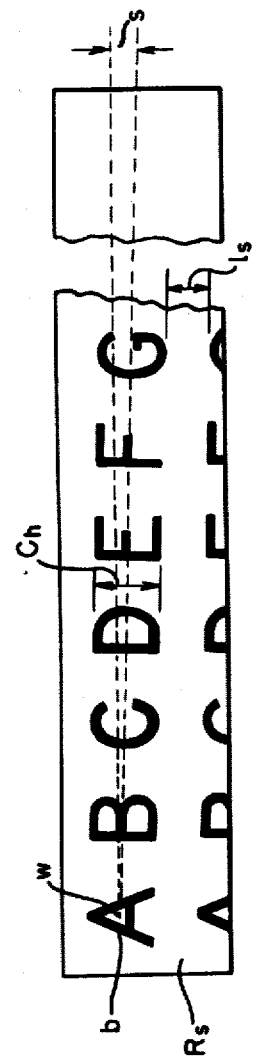
FIG. 2 illustrates a typical region, including a line of characters, of the document of FIG. 1.

FIG. 1 illustrates a system 1 for reading a document 2 and for recognition storage of the document information to permit subsequent processing and accurate readout of same. The document 2 might typically contain information in the form of symbols or characters of a particular type or font arranged in vertically displaced horizontal lines $l_l$ through $l_n$ across the face of the document. FIG. 2 shows an enlarged view of a document region containing a typical document line. As illustrated, the line contains black or character segments b and white or background areas w, these character segments and background areas together defining the alphanumeric characters A,B,C,D,E,F,G. . . . As can be further seen, the center of the character line is skewed vertically by an amount s from the true horizontal. Such skew is accounted for during the reading and recognition process carried out by the system 1, as will be discussed further hereinbelow.

The functioning of the system 1 is controlled by a control processor 3 which provides a repetitive series of instructions to a document scanner 4, to a document storage buffer 5 and to a character recognition unit 6. The series of instructions repeated by the processor 3 results in the sequential scanning, storing and recognition of characters in document regions containing successive lines of the document 2. In this way, recognition storage of the entire contents of the document is realized.

In the discussion to follow, the functioning of the control processor 3 and its associated components 4,5 and 6 to provide recognition storage of the characters in one document line will be described in detail. Storage recognition of the characters in the remaining document lines will be understood to occur by repetition of the described procedure.

The control processor 3 initiates an operating phase by instructing the scanner 4 to commence a scanning sequence. During such a sequence, the scanner 4 reads a document area encompassing a document height slightly in excess of the sum of the document nominal line-to-line spacing $l_s$ plus the nominal character height $C_H$. As a result, at the end of a particular scanning sequence, a region encompassing a single line of the document has been totally read, the portion of the region containing the top of the characters of the line having been read during the previous sequence and the remaining portion during the just ending sequence.

During the scanning sequences, the processor 3 also instructs the storage buffer 5 to store representations of the document regions being scanned. Storage buffer operation is such that at the end of each scanning sequence a document region $R_s$ containing a document line remains in storage. The region $R_s$ shown in FIG. 2 is a typical region of the document 2 that will be stored in the buffer 5.

The representations of the stored document region $R_s$ in the storage buffer are formed during the scanning sequences. During scanning, the storage buffer analyzes the amplitude of incremental time expanses of the scanner analog output signal and assigns each expanse a first state, typically a "1", if the expanse is indicative of a character segment b or a second state, typically a "0", if the expanse is indicative of a background area w. These states of the time expanses are stored by the buffer in a matrix at relative positions corresponding to those of their elemental document areas.

Figure 3:
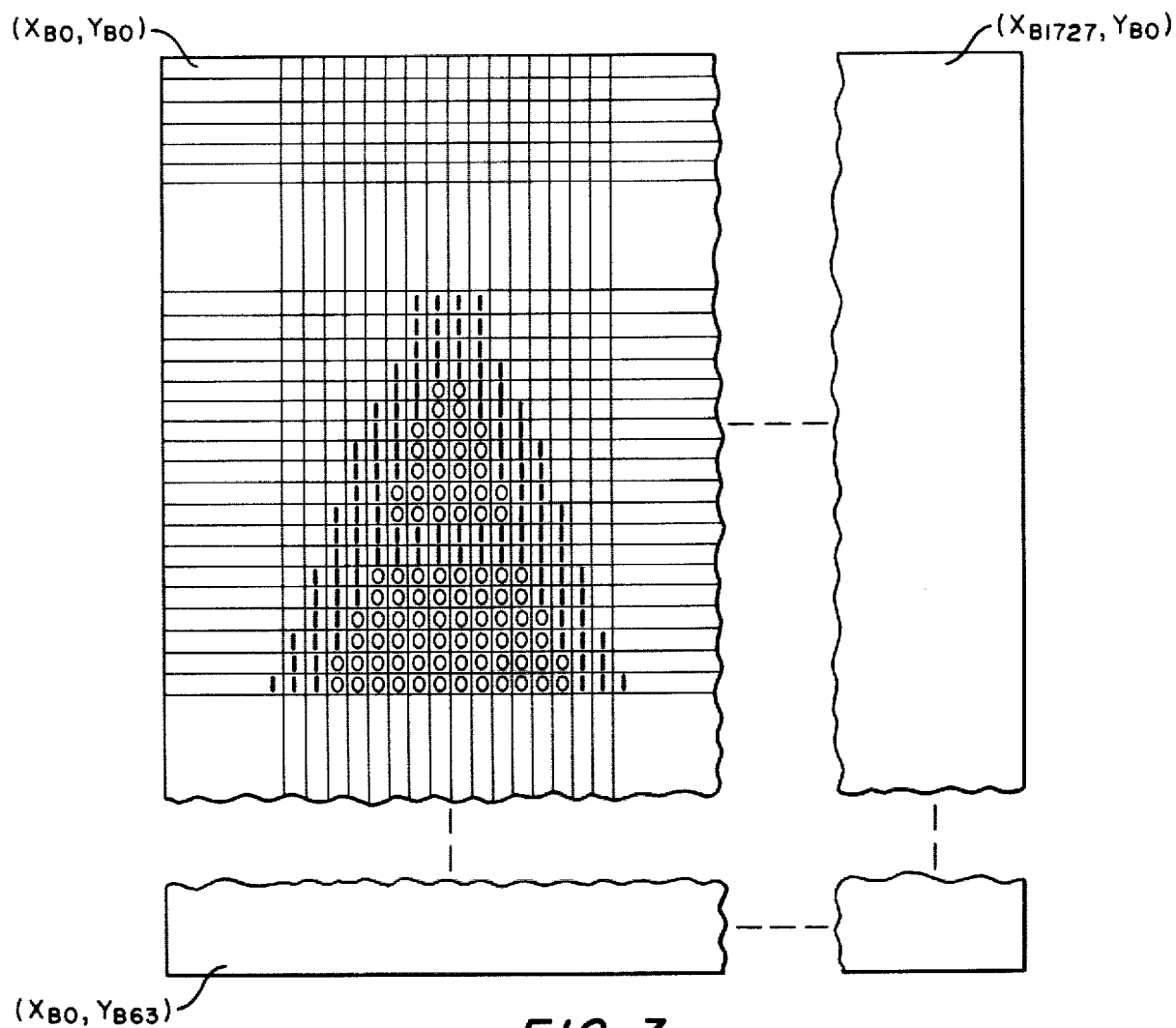
FIG. 3 shows the document region of FIG. 2 stored in a matrix representation in the storage buffer of FIG. 1.

At the end of a scanning sequence, the storage buffer thus stores the document region $R_s$ in a coded matrix of 1's and 0's representative of corresponding elemental character segments and background areas. FIG. 3 shows the buffer matrix representation of the document region illustrated in FIG. 2. As shown, the region has been segmented into (64×1728) incremental areas corresponding to matrix positions $(X_{B0}, Y_{B0})$ to $X_{B1727}$, $Y_{B63}$. The states assigned the matrix positions corresponding to the first character A of the line of the region are also set forth. As illustrated, the character encompasses an array of matrix positions, those matrix positions corresponding to a character segment having been assigned a 1 state and those matrix positions corresponding to background area having been assigned a 0 state.

After completion of a scanning sequence and the storage of a matrix representation of a region $R_s$ of the document 2 in the storage buffer, the control processor 3 instructs the system 1 to enter the interrogation and recognition phase. In this phase, the stored matrix representation is analyzed and the characters of the document line recognized, i.e., determined as to position and type. This process is carried out by the character recognition unit 6.

The recognition unit 6 upon instruction from the processor 3 operates to analyze the stored buffer matrix representation via a recognition procedure which terminates when the processor 3 either recognizes a character in the matrix or decides that no character can be recognized during the procedure in progress. In either case, the processor 3 instructs the unit 6 to repeat the recognition procedure until all the characters in the matrix have been recognized.

In carrying out the recognition procedure, the unit 6 interrogates arrays of buffer matrix positions, these arrays being incrementally displaced in accordance with a predetermined displacement pattern. From each array interrogation and based on predetermined recognition equations stored in the unit 6 and representative of the characters usable on the document 2 (hereinafter referred to as reference characters) the unit 6 compiles a catalogue of errors each indicative of discrepancy between the matrix representation of the particular array and one of the reference characters. After interrogation and error formation for a particular array, the unit 6 selects the lowest errors and adds same and indicia of their corresponding reference characters and corresponding matrix array positions to its store of lowest errors and attendant information obtained from interrogation of previous arrays.

In accordance with the invention, the displacement pattern and interrogation equations of the invention are such that after interrogation and error formation for a number of arrays, the resultant lowest errors in the lowest error store of the unit 6 will evidence at least one reference character which occurs a relatively large number of times and has a relatively small average error in comparison to the other reference characters. This will occur only when the arrays of buffer matrix positions encompass an unknown character corresponding to the one reference character. If no unknown character is encompassed by the arrays, then the above condition does not result.

The interrogation and addition of lowest errors and attendant information to the lowest error store of the unit 6 is carried by the latter unit for successive sets of matrix arrays (i.e., successive sets of displacement pattern positions). After each set of arrays is interrogated, the processor 3 analyzes the lowest error store to assess whether interrogation of the next successive set of arrays should proceed or the lowest error store should be further examined for a frequently occurring reference character of relatively small average error. When the point is reached at which the latter condition pertains, the processor 3 examines the lowest error store to determine whether a particular reference character appears a relatively large number of times with relatively small average error. If the processor 3 finds such a reference character, the processor 3 recognizes this reference character as the unknown character encompassed by the buffer matrix arrays. At this time, the processor 3 also determines from the information in the store, the matrix arrays corresponding to the characters of lowest error indicative of the recognized character; and identifies the average position of these arrays as the position of the recognized character.

If the processor 3 is unable to find a reference character which appears frequently and has a relatively small average error in the unit 6 lowest error store, the processor 3 halts the recognition procedure in progress and instructs the recognition unit 6 to repeat the recognition procedure starting at a new position in the buffer matrix. A more detailed description of the recognition procedure is given below.

Figure 4:
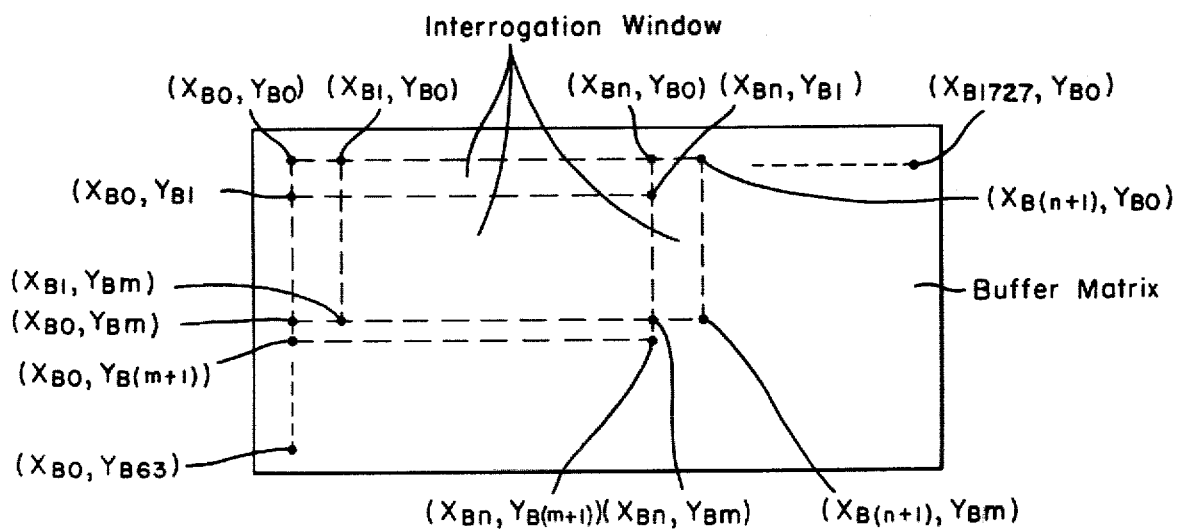
FIG. 4 illustrates various arrays of matrix positions of the matrix representation in the storage buffer.

The incremental arrays of buffer matrix positions interrogated during a recognition procedure can be defined in terms of an interrogation or window matrix W which is incrementally positioned in accordance with the displacement pattern. The window matrix has incremental positions corresponding to those of the buffer matrix and total matrix extent sufficient to encompass the buffer matrix representation of the largest character useable on the document 2. Such a window matrix can be represented by the incremental buffer matrix positions $P(X_{B(i+k)}, Y_{b(j+l)})$ through $P(X_{B(i+k+m)}, Y_{B(j+l+n)})$, where i and j are the parameters of an initial interrogation position established by the processor 3 at the start of a recognition procedure, k and l are variables which are varied by the recognition unit 6 in accordance with the displacement pattern and n and m are constants sufficiently large to encompass the largest character representation to be stored. For example, as illustrated in FIG. 4, for initially set positions of i=0 and j=0 and displacement pattern positions (k=0, l=0), (k=0, l=1) and (k=1, l=1), the window matrix will define the buffer matrix arrays $P(X_{B0}, Y_{B0})$ through $P(X_{Bm}, Y_{Bn})$, $P(X_{B0}, Y_{Bl})$ through $P(X_{Bm}, Y_{B(n+l)})$ and $P(X_{Bl}, Y_{Bl})$ through $P(X_{B(m+l)}, Y_{B(n+l)})$. In this example, the second array is displaced vertically one incremental position relative to the first array and the third array is displaced horizontally and vertically one incremental position relative to the first array.

As above-noted, during a given interrogation procedure, the parameters i and j of the window matrix are set by the processor 3, and thereafter the parameters k and l are varied by the interrogation unit 6 in accordance with the displacement pattern to define the incremental buffer arrays to be interrogated. More particularly, after setting of the parameters i and j, the values of k and l are set at respective values established by the first position values of a first set of displacement pattern positions. This defines the first array of buffer matrix positions to be interrogated. The unit 6 then interrogates in sequence, each position of the defined array. As above-indicated, the results of these interrogations are utilized by the unit 6 to catalogue errors for the respective reference characters, the lowest of these catalogued errors being used to update the unit 6 lowest error store. The unit 6 then proceeds to successively set k and l at respective values established by the remaining position values of the first set of displacement pattern positions. These values define further arrays of buffer matrix positions to be interrogated.

The values k and l of the window matrix will continue to be incremented by the position values of succeeding sets of displacement pattern positions to define additional sets of matrix arrays until the unit 6 lowest error store, which is updated after each array interrogation, evidences to the processor 3 at the end of a set of displacement pattern positions that a recognition examination should be made. After the processor 3 makes such an examination and either recognizes or fails to recognize a character, the processor instructs the unit 6 to set the parameters i and j at new values and to repeat the recognition procedure by varying k and l in accordance with the sets of displacement pattern positions to establish new sets of matrix arrays for interrogation. When the processor determines that a recognition cannot be made during a recognition procedure, the new values of i and j set by the processor are established from predetermined values stored in the processor. When a recognition is made, however, the processor sets the new i and j values based on the expected position of the next successive character in the buffer matrix, as will be explained in greater detail hereinbelow.

As above-described, for each window location defined by the displacement pattern, and, thus each matrix array utilized during a recognition procedure, the unit 6 interrogates in sequence the matrix positions and utilizes the results of each interrogation to form errors for respective reference characters based on corresponding predetermined recognition equations. In the present practice, each recognition equation corresponds to a different reference character and includes a coded information based on incremental positions of the character. These incremental positions correspond to the window matrix positions and, as a result, to the interrogation array positions defined thereby. Thus, the positions $P_c(X_0,Y_0)$ to $P_c(X_n,Y_m)$ of each recognition equation correspond to the window matrix positions $P(X_{B(i+k)}, Y_{B(j+l)})$ through $P(X_{P(i+k+m)}, Y_{B(j+l+n)})$.

Each recognition equation is formed such that it contains a coded state for incremental positions which register with high probability as character segments or background areas for expected distortions and displacements of the given character. Equation positions falling within this catagory provide the most useful character recognition information and those positions representative of a character segment are coded as 1's and those as background as 0's, as was the case for coding the document regions in the buffer matrix. Positions in the recognition equations not provided with a coded state are considered irrelevant to the character and may be denoted by a—indicative of a don't care position. The recognition equations can be derived by defining for each character a skeleton and anti-skeleton function and assigning to the equation positions falling on the skeleton a 1 state and those falling on the anti-skeleton a 0 state. The skeleton of a character can be defined as all points within that character for which a Boolean valued skeleton function of the character is true; likewise, the anti-skeleton might be defined as all points for which an anti-skeleton function of the character is true. For example, the skeleton function might be all those points surrounded (in some neighborhood) by at least a given number of other character points. Likewise, the anti-skeleton function might be all those points containing (in some neighborhood) fewer than a given number of points.

FIGS. 5A and 5B illustrate the skeleton and anti-skeleton functions of the character A of the document region of FIG. 2. These functions are indicated by the darkened points in the respective shaded areas. FIG. 6 shows portions of a typical character recognition equation for the reference character A, this equation being referenced to the corresponding window matrix positions.

The formation of the errors for the reference characters during the interrogation of each buffer matrix array is based on the character recognition equations. For a particular buffer matrix array defined by the window matrix and the displacement pattern interrogation of a position in that array by the unit 6 causes the state of the position to be read. The unit 6 then simultaneously looks at the corresponding position in each stored character recognition equation to determine whether the read state differs from the position state defined in the equation. If the states differ for any equation, then the unit 6 generates and stores an error for the corresponding reference character. If the character equation position contains no coded state, i.e., is a–(don't care), then no comparison is made and no error signal generated.

For example, if the state of the m=4, n=14 matrix array position is read as a 0, the unit 6 will generate an error for the character A, since the character recognition equation for this character shown in FIG. 6 requires a 1 for this matrix positions. On the otherhand, if the state of this matrix position is read as a 1, then the unit 6 will generate no error, since the read state is the same as that required by the recognition equation.

Interrogation of subsequent points in the array by the unit 6 results in further errors being generated based on differences between the read state and the corresponding character equation state and these errors are used by unit 6 to increment those errors already stored for corresponding characters. The result of the interrogation of a single array is thus a catalogue of errors corresponding to the reference characters. Interrogation by the unit 6 of every other array defined by the window matrix and displacement pattern in a recognition procedure results in similar catalogues of errors corresponding to the reference characters.

As was discussed above, reliable recognitions are realized in the present system due to the above-described nature of the character recognition equations as well as to the nature of the displacement pattern. In accordance with the invention, such pattern is selected to follow a spiral-like path. FIGS. 7A and 7B show typical spiral-like paths, usable with the invention, the path in FIG. 7B being preferred. The tables in FIGS. 8A and 8B depict the k and l parameters of the window matrix defined by the spiral-paths in FIGS. 7A and 7B, respectively.

In the displacement patterns of FIGS. 7A and 7B, the positions of the pattern are incrementally displaced with the increment from one position to the next being a composite of a number of vertical and/or horizontal displacements and being definable in terms of the buffer matrix array positions. In the pattern of FIG. 7A, the displacement pattern increment is equal to one matrix array position. Thus, each position can be reached by a horizontal or vertical displacement equal to one matrix array position. In FIG. 7B, the displacement pattern increment varies and is either equal to one array position or two array positions. Thus, moving from position 11 to 12 in this pattern requires a single vertical movement equal to one array position. On the other hand, moving from position 12 to 13 requires a single vertical movement and a single horizontal movement each equal to an array position and, hence, a displacement pattern increment (i.e., composite vertical and horizontal displacement) equal to two array positions. A range for the displacement pattern increment is from 1 to 2 matrix array positions, the value of 1 being preferable.

With the displacement pattern in the form of a spiral-like path, the store of reference characters of the unit 6 resulting from interrogation of the matrix arrays defined by the pattern will evidence the above-described characteristic of a frequently appearing reference character with low average error, thereby permitting recognition of such character as the unknown character encompassed by the arrays. This type of pattern also permits the sets of displacement pattern positions used during the interrogation procedure and after each of which the processor 3 evaluates whether a recognition determination should be made, to be defined by the rings of the spiral. If after interrogation of a set of positions defined by a particular ring such evaluation results in a recognition determination, then the recognition procedure can be terminated at this ring of the spiral by the processor 3. Otherwise, the procedure can be continued utilizing the next ring.

After a recognition has been made by the processor 3, the processor 3 proceeds to a next recognition procedure to recognize further characters in the buffer matrix representation. In order to significantly reduce processing time, the next recognition procedure is initiated by the processor at a position in the buffer matrix at which the processor expects the next character. Thus, as mentioned hereinabove, the processor 3 selects the parameters i and j of the window matrix so as to place the first array defined by the window at the expected location of the next character. The expected location, in turn, is determined by the processor from the determined position of the previously recognized characters in the buffer matrix and from stored values of nominal character characteristics, such as nominal character-to-character spacing, etc. This procedure also accounts for the skew s in the document line, thereby preventing same from having a detrimental effect on system operation.

In describing the window matrix of the invention hereinabove, it was assumed that the matrix included all the matrix positions in the array $P(X_{B(i+k)}, Y_{B(j+l)})$ to $P(X_{B(i+k+m)}, Y_{B(j+l+n)})$. However, it has been found that processing time can be reduced without disturbing system accuracy when only every other vertical and horizontal array position is actually used to define the window and consequently the buffer matrix arrays being interrogated. This results in a window matrix as shown in FIG. 9 wherein the X positions indicate used window positions.

Figure 10:
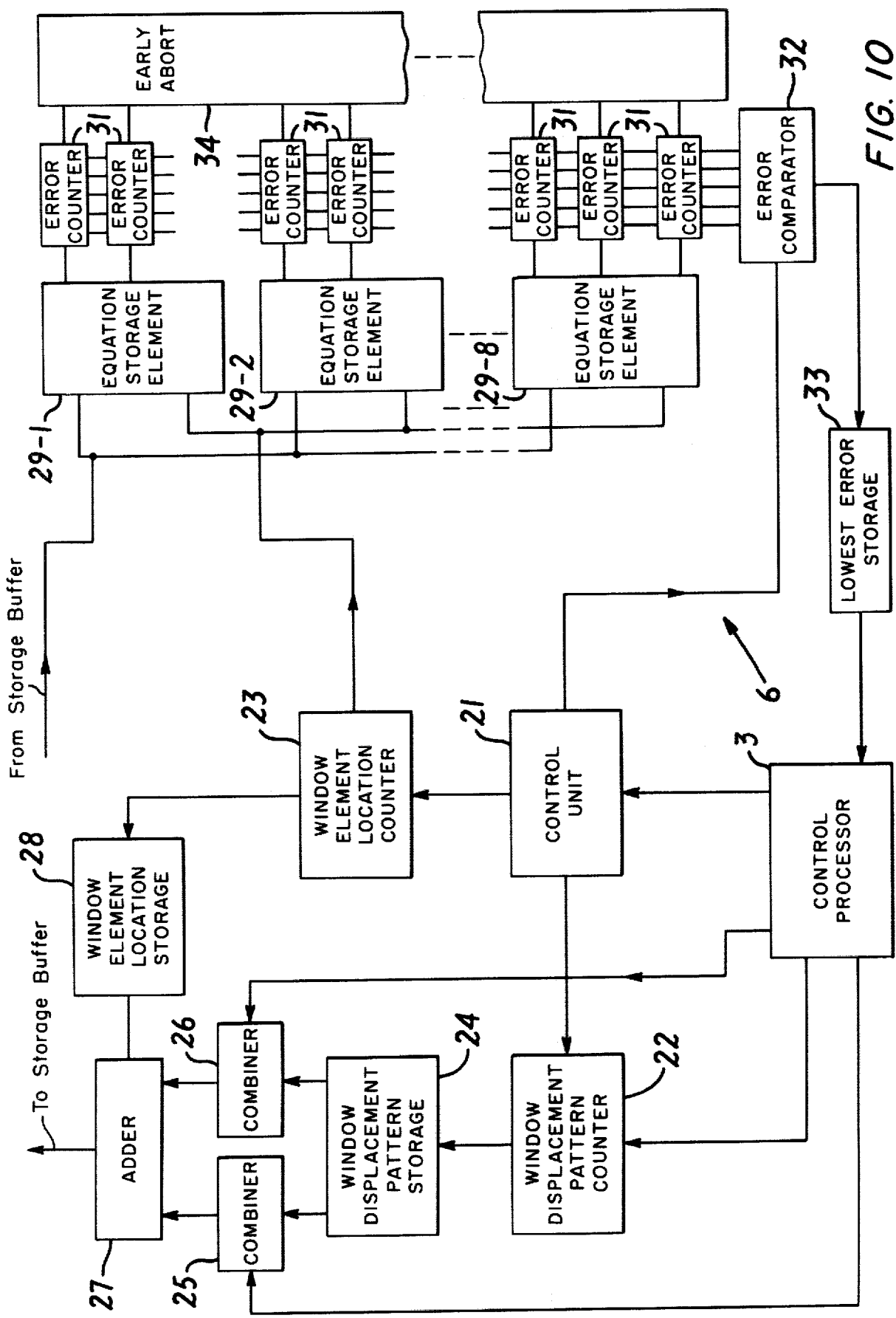
FIG. 10 illustrates a more detailed block diagram of the character recognition unit of FIG. 1.

FIG. 10 illustrates a more detailed block diagram of the character recognition unit 6 of FIG. 1. As illustrated, the unit 6 comprises a control unit 21 which receives instructions from the processor 3 and in response thereto sets and increments the operation of certain of the other components included in the unit.

Signals from the control unit 21 are relayed to a window displacement pattern counter 22 and to a window element location counter 23. The counter 22 feeds a window displacement pattern storage 24 which stores the window displacement pattern (k and l values) followed by the window matrix and issues same to combiners 25 and 26 to which the processor 3 applies the parameter values (i and j values) of the initial interrogation position. The combiners 25 and 26 feed an adder 27 which is simultaneously fed from a window element location storage 28. The storage 28 stores the window element locations (0 to m and 0 to n values) and is incremented by the window element location counter 23.

The output of the adder 27 defines the window matrix positions to be used to access and interrogate the storage buffer matrix. The results of the interrogation of the storage buffer matrix are fed to a plurality of character recognition equation storage elements, shown as elements 29-1 through 29-8, which are also fed the output of the window element location counter 23. The equation storage elements each store the character recognition equations for a number of reference characters, and each feeds an error counter 31 for each of its stored recognition equations. The outputs of the error counters 31 are fed to an error comparator 32 which selects the lowest errors, typically the two lowest, and feeds the selected errors and their respective counter numbers to a lowest error storage 33.

The counter 23 stores in coded form sequential point numbers corresponding to the locations of the window elements (i.e., stores numbers 0 through $[m+1)\times(n+1)]-1$) and upon signaling from the control 21 accesses the next sequential number which serves as an address to the window element location storage 28. The latter storage reads from that address the corresponding window element location (i.e., the corresponding ones of the 0 to m and 0 to n values). Simultaneously with this procedure the control 21 signals the pattern counter 22 which accesses the next displacement pattern position (i.e., the next k and l values). These values are conveyed to the respective adders 25 and 26 wherein the initially set interrogation parameters i and j values) are added to the corresponding displacement position. The summed positions are then fed to the adder 27 where they are added to the window element location to obtain the window matrix position defining the next buffer matrix position to be interrogated.

Subsequent to interrogation of the buffer matrix at the defined window matrix position, the state of the position is read from the matrix and fed to each of the equation storage elements 29-1 through 29-8. These elements simultaneously receive the coded point number from position counter 23. The infed state and infed coded point number to each storage element simultaneously access and cause outputs for the character recognition equations for which the position number is relevant and for which the infed state is opposite that required by the equation. These outputs, in turn, increment the error counters 31 of the corresponding character recognition equations.

FIG. 11 illustrates schematically this procedure for the storage element 28-1. This element contains the character recognition equations for the reference characters A-F. In FIG. 11, only characters marked with a 1 are accessed and result in outputs when a corresponding point number and state are present. Thus, for example, the point 1 with the state 0 will access only the equations for reference characters B, D, E and F. Only the error counters for these characters will thus be incremented for a 0 state in the first matrix position.

After the storage elements are accessed and the appropriate error counters incremented, the control 21 instructs the matrix element location counter 23 to increment and the next stored window element location values (i.e., the next corresponding ones of the 0 to m and 0 to n values) are read and appropriately summed with the sum of the initial interrogation parameter values and the pattern position values (i.e., $(i+k)$ and $(j+l)$ values) to define the next matrix position to be interrogated. Again, the state of the buffer storage is read for this matrix position and the read state and the point number sent to the storage elements 29-1 to 29-8. The storage elements again increment the error counters 31 corresponding to the recognition equations for which the read state is an error.

The control 21 increments the matrix element location counter 22 until all the buffer matrix positions defined by the window elements have been read out. The error counters 31 at this point contain composite errors for the reference characters for this window position and, hence, the array buffer matrix positions defined thereby. When this point is reached the control 21 causes the error counters 31 to shift sequentially through error comparator 32 which determines which error counters have the lowest errors. These errors along with an identification of their corresponding counters which serve as indicia of the associated reference characters and the corresponding window pattern position are then forwarded to the lowest error storage 33.

The control 21 then proceeds to reset the error counters, the window element location counter, and the error comparator and to increment the displacement pattern counter to access the next array of buffer matrix positions. In particular, the above procedure of incrementing the window element location counter 23 is then repeated and another set of errors catalogued for this array of buffer matrix positions. These errors are again compared in the comparator 32 and the lowest errors and their respective counter identifications and pattern positions stored in the lowest error storage 33. This procedure is continued by the control 21 for successive sets of displacement pattern positions resulting in lowest error storage values corresponding thereto, unless otherwise instructed by the processor 3.

The control 21 increments the displacement pattern counter 22 through sets of pattern positions, as above-described, until at the end of a set of positions, the processor 3 decides from the lowest error store information that a recognition determination is to be made. At this point, the processor 3 analyzes the stored lowest errors and either recognizes or fails to recognize a character. Once a character is recognized, or a decision is made that a character cannot be recognized, the processor 3 will reset the lowest error storage 33, increment the initial interrogation position combiners, and instruct the control 21 to repeat the recognition procedure.

The unit 6 of FIG. 10 is provided with a further circuit which enables the unit to make a judgment that there is little liklihood of an unknown character being present in the particular array of buffer matrix positions being presently interrogated and, therefore, that the recognition procedure should proceed to the next array defined by the window matrix and next displacement pattern position. This circuit is in the form of an early abort network 34 which is connected to all the error counters 31 for monitoring the counter outputs. When all the error counters exceed a predetermined error, the network 34 signals the control 21 which thereupon halts the procedure in progress, resets the respective counters and increments the position displacement counter to begin interrogation of the next array.

In typical practice, the components of the present invention can all be conventionally available devices suitably integrated and programmed to carry out the procedures discussed hereinabove. Thus, for example, the displacement pattern storage 24, window element location storage 28 and character recognition equation elements 29-1 to 29-8 can all be suitably programmed read only memories (PROMS) of the type manufactured by Texas Instruments under model No. SN 74S472. The pattern counter and the window element location counter can likewise be of conventional design. Suitable counters might be model No. SN 74S163 counters manufactured by Texas Instruments. Error comparator 32 might be a model No. SN 74S85 comparator manufactured by Texas Instruments. A model No. Z80 processor manufactured by Mostek might serve as the control processor 3. The control unit 21 might comprise standard TTL 7400 series parts manufactured by Texas Instruments. The document scanner 4 typically might be a model No. CCD 122 scanner manufactured by Fairchild Camera and Instrument Co. Similarly, the storage buffer 5 might comprise model No. 2147 storage elements manufactured by Intel Corporation.

As discussed above, the processor 3 analyzes the lowest error store after interrogation of each set of matrix arrays to determine whether a further set of arrays should be interrogated or whether a recognition determination should be made. In carrying out this analysis, the processor 3 examines the lowest error store after interrogation of each set of matrix arrays, and, if there are no lowest errors stored, it instructs the recognition unit 6 to continue with interrogation of the next set of arrays. A similar instruction is given to the unit 6 by the processor 3, if lowest errors are stored, but the just interrogated array has resulted in storage of a lowest error corresponding to a reference character for which there are no other stored lowest errors or only stored lowest errors of higher value. In both of the latter situations, if the just interrogated set of arrays is the last set, then instead of instructing the unit 6 to interrogate further, the processor 3 makes a recognition determination, i.e., analyzes the lowest error store for the lowest frequency occurring errors. If lowest errors are stored, but the just interrogated array has not resulted in a lowest error for a reference character for which there are no other stored lowest errors or only stored lowest errors of higher value, the processor 3 will make a recognition determination, if recognition of a predetermined number of characters (e.g., two characters) has already been made from the stored buffer matrix array. Even if the latter has not occurred, but there has not also been a predetermined number of failures (e.g. two failures) to recognize spaces, the processor will again make a recognition determination. Finally, if there have been a predetermined number of failures to recognize spaces, the processor will instruct the unit 6 to interrogate a further set of arrays, provided the just interrogated set of arrays was not the last set. If it was the last set of arrays, then no such instruction is given and the processor makes a recognition determination.

The processor 3 makes a recognition determination by examining the unit 6 lowest error store to determine whether the stored lowest errors evidence a reference character which occurs frequently and has small average error and, therefore, can be recognized as an unknown character. The degree of frequency and magnitude of error required to result in a recognition by the processor 3 will depend upon the degree of accuracy required. In preferred practice, a recognition is made by the processor 3 by first accessing the lowest and next to lowest errors in the unit 6 lowest error store. If no errors are stored then the processor makes no recognition. If errors are stored, the processor 3 then initially determines whether the difference between the next lowest error and lowest error is less than a first predetermined amount. If the difference is not less than (i.e., is equal to or greater than) this first amount, the processor 3 continues its analysis without qualification. If the difference is less than this first amount, the processor 3 also continues its analysis, but with an indication that any resultant recognition be qualified, i.e., be tagged as confusing, due to the closeness of the second lowest and lowest errors, thereby warranting further checking by an operator. The analysis carried out by the processor 3 after this initial determination is as follows. The processor first determines whether the difference between the next lowest error and the lowest error is equal to or greater than a second predetermined amount greater than the first amount. The processor 3 then compares the lowest error to a maximum error. The maximum error is selected as a first maximum when the difference between the second lowest error and the lowest error is equal to or greater than the second amount. If the difference is less than the second amount then a second maximum less than the first maximum is selected. In either case, the lowest error is compared to the maximum and if it is less than the maximum a recognition of the character corresponding to the lowest error is made. If the lowest error exceeds the maximum, then a recognition is also made, but the recognition is a qualified one, i.e., is tagged as questionable indicating further checking by an operator is warranted. Typical values for the above parameters are as follows: first predetermined amount, 2; second predetermined amount, 4; first maximum, 6; and second maximum, 4.

It should be further pointed out that with the present invention, multiple characters (e.g., an alphanumeric character having an accent character or an underlined character) will be recognized provided each of the characters is represented by a corresponding character recognition equation. In such case, the analysis of the store of lowest errors by the processor 3 will result in two characters which appear frequently and have small average error. The processor 3 will thus recognize both characters as to their type and position in the manner described above, and will determine if such simultaneous recognition is a meaningful combination of characters.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for recognition storage of unknown document characters contained within a matrix representation of a document region comprising:
   recognition evaluation means including:
   means for interrogating a plurality of arrays of positions of said matrix representation, said arrays being incrementally displaced in accordance with a predetermined displacement pattern;
   means for forming for each interrogation of an array a catalogue of errors each indicative respectively of discrepancy between the interrogated representation in that array and one of a number of reference characters usable on said document, each reference character being represented by a corresponding predetermined character recognition equation;
   and means for selecting the lowest errors from each catalogue and storing said selected lowest errors and indicia representative of the reference characters corresponding to said selected lowest errors;
   control processor means for controlling said recognition evaluation means and for receiving said stored lowest errors and said indicia and determining a reference character recognizable as an unknown document character;
   and means for halting the interrogation of a particular array by said recognition means when the errors in the catalogue of errors being formed for that array all exceed a predetermined value.

2. Apparatus for recognition storage of unknown document characters contained within a matrix representation of a document region comprising:
   recognition evaluation means including:
   means for interrogating a plurality of arrays of positions of said matrix representation, said arrays being incrementally displaced in accordance with a predetermined displacement pattern;
   means for forming for each interrogation of an array a catalogue of errors each indicative respectively of discrepancy between the interrogated representation in that array and one of a number of reference characters usable on said document, each reference character being represented by a corresponding predetermined character recognition equation;
   and means for selecting the lowest errors from each catalogue and storing said selected lowest errors and indicia representative of the reference characters corresponding to said selected lowest errors;
   and control processor means for controlling said recognition evaluation means and for receiving said stored lowest errors and said indicia and determining a reference character recognizable as an unknown document character; wherein:
   said control processor includes means for identifying the location in said matrix representation of said determined reference character.

3. Apparatus in accordance with claim 2 wherein:
   said means for identifying comprises:
   means for determining the arrays resulting in the stored errors whose corresponding reference characters correspond to the determined reference character;
   and means for calculating from said determined arrays the position of the determined reference character.

4. Apparatus in accordance with claim 3 wherein:

said means for calculating comprises means for forming an average of the positions of said determined arrays.

5. Apparatus in accordance with claim 2 wherein:
said recognition means repeats said interrogating, forming of catalogues of errors and selecting and storing of lowest errors for further pluralities of arrays of matrix positions, each of said further pluralities being incrementally displaced in accordance with said predetermined position pattern;
said control processor means for each of said repetitions receives the lowest errors resulting therefrom and determines a reference character recognizable as an unknown document character;
and said means for identifying identifies the location of each of said determined reference characters.

6. Apparatus in accordance with claim 5 wherein:
said control processor includes means for locating the first array in each of said further pluralities in said matrix representation at a location which is a function of the identified locations of the determined reference characters resulting from the interrogation of the preceding arrays.

7. Apparatus in accordance with claim 6 wherein:
said locating means locates said first array in each of said further pluralities in said matrix at a location which is a further function of the nominal characteristics of the characters usable on said document.

8. Apparatus for recognition storage of unknown document characters contained within a matrix representation of a document region comprising:
recognition evaluation means including:
means for interrogating a plurality of arrays of positions of said matrix representation, said arrays being incrementally displaced in accordance with a predetermined displacement pattern;
means for forming for each interrogation of an array a catalogue of errors each indicative respectively of discrepancy between the interrogated representation in that array and one of a number of reference characters usable on said document, each reference character being represented by a corresponding predetermined character recognition equation;
and means for selecting the lowest errors from each catalogue and storing said selected lowest errors and indicia representative of the reference characters corresponding to said selected lowest errors;
and control processor means for controlling said recognition evaluation means and for receiving said stored lowest errors and said indicia and determining a reference character recognizable as an unknown document character; wherein:
each recognition equation corresponding to a particular reference character is defined in terms of certain reference character positions encompassed by that reference character, each reference character position being assigned a first, second or third state representative of said reference character position containing a character segment, containing background area or being irrelevant to that reference character.

9. Apparatus in accordance with claim 8 wherein:
said matrix representation of said document region comprises matrix positions each of which is assigned a first or second state representative of said matrix position containing a character segment or background area.

10. Apparatus in accordance with claim 9 wherein:
said evaluation means includes:
for the interrogation of each array of matrix positions, means for determining the assigned state of each matrix position in that array;
and for the forming of a catalogue of errors for each array means responsive to said assigned state determining means for simultaneously generating for each array matrix position whose assigned state has been determined an error corresponding to each reference character having a recognition equation including a character position corresponding to that matrix position, provided the assigned state of that matrix position and the assigned state of the corresponding character position differ; and means for summing the errors generated for each character to form a composite error for that reference character.

11. Apparatus in accordance with claim 8 wherein:
the positions used in each reference character recognition equation to define that reference character include those which contain a character segment or a background area for substantially all expected degrees of distortion and/or displacement of that reference character.

12. Apparatus in accordance with claim 8 wherein:
the positions used in each reference character recognition equation to define that reference character include those which are within the skeleton and anti-skeleton representations of that reference character.

13. Apparatus in accordance with claim 1, 2 or 8 wherein:
said predetermined displacement pattern and said predetermined recognition equations result in said stored lowest errors and corresponding reference characters evidencing at least one reference character having a high frequency of occurrence and a small average error in comparison to the frequency of occurrence and average error evidenced for other reference characters.

14. Apparatus in accordance with claim 13 wherein:
said control processor means selects as recognizable a reference character evidenced by said stored lowest errors as having a small average error and a high frequency of occurrence.

15. Apparatus in accordance with claim 1, 2 or 8 wherein:
said predetermined pattern follows a spiral-like path.

16. Apparatus in accordance with claim 15 wherein:
said spiral-like path comprises incrementally spaced path positions, the increment between successive path positions being definable in terms of one or more matrix array positions.

17. Apparatus in accordance with claim 16 wherein:
said increment between successive path positions varies.

18. Apparatus in accordance with claim 17 wherein:
said increment is in a range from 1 to 2 matrix array positions.

19. Apparatus in accordance with claim 1, 2 or 8 further comprising:
means for scanning said document region to provide an analog signal indicative of the content of said document region;
means for processing said analog signal to develop a digital signal each of whose bits corresponds to an incremental area of said document region and is assigned a first or second state depending upon whether that incremental area substantially contains a document segment or substantially contains a background area;

and means for assembling said bits of said digital signal into said matrix representation of said document region.

20. Apparatus in accordance with claim 1, 2 or 8 wherein:

said means for interrogating includes means for defining said pluralities of arrays in terms of a window matrix displaceable in accordance with said predetermined displacement pattern.

21. Apparatus in accordance with claim 20 wherein said matrix representation includes matrix positions $P(X_{BO}, Y_{BO})$ through $P(X_{B(m+r)}, Y_{B(n+s)})$ and wherein:

said window matrix is defined as containing matrix positions $P(X_{B(i+k)}, Y_{B(j+l)})$ through $P(X_{B(i+k+m)}, Y_{B(j+l+n)})$, where i and j are parameters of an initial interrogation position, k and l are parameters defining the positions of said displacement pattern and m and n are constants of sufficient value to cover the matrix representation of the largest character usable on said document.

22. Apparatus for recognition storage of unknown document characters contained within a matrix representation of a document region comprising:

recognition evaluation means including:

means for interrogating a plurality of arrays of positions of said matrix representation, said arrays being incrementally displaced in accordance with a predetermined displacement pattern;

means for forming for each interrogation of an array a catalogue of errors each indicative respectively of discrepancy between the interrogated representation in that array and one of a number of reference characters usable on said document, each reference character being represented by a corresponding predetermined character recognition equation;

and means for selecting the lowest errors from each catalogue and storing said selected lowest errors and indicia representative of the reference characters corresponding to said selected lowest errors;

and control processor means for controlling said recognition evaluation means and for receiving said stored lowest errors and said indicia and determining a reference character recognizable as an unknown document character; wherein:

said means for interrogating includes means for defining said pluralities of arrays in terms of a window matrix displaceable in accordance with said predetermined displacement pattern;

said window matrix defines positions located at every other vertical and horizontal position of said matrix representation.

* * * * *